United States Patent
Zhang et al.

(10) Patent No.: US 12,258,489 B2
(45) Date of Patent: Mar. 25, 2025

(54) COMPOSITION USEFUL FOR PREPARING MULTICOLOR PAINT

(71) Applicant: Dow Global Technologies LLC, Midland, MI (US)

(72) Inventors: Shiling Zhang, Shanghai (CN); Minbiao Hu, Shanghai (CN); Dong Yun, Shanghai (CN); Wei Li, Shanghai (CN); Huan Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 574 days.

(21) Appl. No.: 16/472,064

(22) PCT Filed: Dec. 20, 2016

(86) PCT No.: PCT/CN2016/111071
§ 371 (c)(1),
(2) Date: Jun. 20, 2019

(87) PCT Pub. No.: WO2018/112754
PCT Pub. Date: Jun. 28, 2018

(65) Prior Publication Data
US 2020/0095434 A1 Mar. 26, 2020

(51) Int. Cl.
*C09D 175/04* (2006.01)
*C09D 5/02* (2006.01)
(Continued)

(52) U.S. Cl.
CPC ............... *C09D 5/29* (2013.01); *C09D 5/025* (2013.01); *C09D 5/027* (2013.01); *C09D 5/028* (2013.01);
(Continued)

(58) Field of Classification Search
CPC .......... C09D 7/62; C09D 11/037; C09D 7/61; C09D 7/67; C09D 5/36; C09D 7/68; C09D 11/322; C09D 7/69; C09D 7/80; C09D 7/41; C09D 7/70; C09D 11/17; C09D 17/001; C09D 17/004; C09D 11/101; C09D 11/30; C09D 11/326; C09D 11/36; C09D 11/40; C09D 11/52; C09D 11/54; C09D 163/00; C09D 17/00; C09D 17/003; C09D 17/006; C09D 5/02; C09D 5/024; C09D 5/025; C09D 5/028; C09D 5/082; C09D 5/084; C09D 5/14; C09D 5/22;
(Continued)

(56) References Cited

U.S. PATENT DOCUMENTS

| 3,950,283 A | 4/1976 | Sellars et al. |
| 4,264,322 A | 4/1981 | Lewis et al. |

(Continued)

FOREIGN PATENT DOCUMENTS

| CN | 1735668 | 2/2006 |
| CN | 101215787 A | * 7/2008 |

(Continued)

OTHER PUBLICATIONS

International Search Report & Written Opinion for related PCT Application PCT/CN2016/111071, mailed Sep. 22, 2017 (14 pgs).

*Primary Examiner* — Shuangyi Abu Ali

(57) ABSTRACT

A composition comprising a first, synthetic gel and a second gel is useful for the preparation of waterborne multicolor paints.

13 Claims, 2 Drawing Sheets

(51) Int. Cl.
  *C09D 5/29* (2006.01)
  *C09D 101/02* (2006.01)
  *C09D 105/00* (2006.01)
  *C09D 133/08* (2006.01)
  *C08G 18/10* (2006.01)
  *C08G 18/30* (2006.01)
  *C08G 18/75* (2006.01)
  *C08G 18/76* (2006.01)

(52) U.S. Cl.
  CPC ......... *C09D 101/02* (2013.01); *C09D 105/00* (2013.01); *C09D 133/08* (2013.01); *C09D 175/04* (2013.01); *C08G 18/10* (2013.01); *C08G 18/302* (2013.01); *C08G 18/755* (2013.01); *C08G 18/7621* (2013.01)

(58) Field of Classification Search
  CPC ... C09D 5/24; C09D 5/29; C09D 5/44; C09D 7/40; C09D 7/44; C09D 7/63; C09D 101/02; C09D 105/00; C09D 133/08; C09D 175/04; C09D 5/027; C09D 133/04; C08G 18/10; C08G 18/302; C08G 18/755; C08G 18/7621
  See application file for complete search history.

(56) References Cited

U.S. PATENT DOCUMENTS

| | | | |
|---|---|---|---|
| 4,812,492 A * | 3/1989 | Eckes | C09D 11/03 523/351 |
| 4,847,316 A * | 7/1989 | Schick | C08L 67/00 524/88 |
| 5,314,535 A | 5/1994 | Lynch et al. | |
| 5,318,619 A * | 6/1994 | Lynch | C09D 5/29 106/162.82 |
| 5,403,750 A | 4/1995 | Braatz et al. | |
| 5,480,480 A * | 1/1996 | Lynch | C09D 5/29 106/181.1 |
| 6,005,031 A | 12/1999 | Bremer-Masseus et al. | |
| 6,528,577 B2 | 3/2003 | Isozaki et al. | |
| 8,524,840 B2 | 9/2013 | Zhu et al. | |
| 2002/0137839 A1 | 9/2002 | Isozaki et al. | |
| 2004/0225051 A1 | 11/2004 | Moy | |

FOREIGN PATENT DOCUMENTS

| | | |
|---|---|---|
| CN | 101693800 | 4/2010 |
| CN | 102391767 | 3/2012 |
| CN | 103952051 | 7/2014 |
| CN | 104448351 | 3/2015 |
| CN | 105969016 | 9/2016 |
| CN | 106084961 | 11/2016 |
| EP | 505664 A1 | 9/1992 |
| EP | 1004638 | 11/2004 |
| GB | 2078243 | 1/1982 |
| JP | 2007231151 | 9/2007 |
| JP | 2007238919 | 9/2007 |
| JP | 2007296459 | 11/2007 |
| JP | 2007321045 | 12/2007 |
| WO | 00/36029 A1 | 6/2000 |
| WO | 2004074343 | 9/2004 |

* cited by examiner

COMPOSITION USEFUL FOR PREPARING MULTICOLOR PAINT

This application is a National Stage Application under 35 U.S.C. § 371 of International Application Number PCT/CN2016/111071, filed Dec. 20, 2016 and published as WO 2018/112754 on Jun. 28, 2018, the entire contents of which are incorporated herein by reference in its entirety.

BACKGROUND OF THE INVENTION

The invention relates to multicolor paints and compositions useful for their preparation.

Waterborne multicolor paint (MCP) is a well-known type of decorative wall coating. After application, it can produce different decorative appearances on exterior or interior walls. The ornamental and durable surface coating makes multicolor wall paints an ideal solution for redecoration or new construction. Prior art multicolor paints utilized diversified technologies, such as metal ion based cross-linking, redispersing of colorant particles and organic protection gel, etc. Nevertheless, some inherent problems still restrain the growth of multicolor paint.

Prior art based on ionic interactions, where the cross-linker includes ions of calcium, aluminum, zinc and boron, have the potential to hurt the stability of acrylic polymer binders, resulting in the loss of final coating performance properties.

In many prior art multicolor paints, natural polysaccharides or derivatives thereof, such as cellulose and its derivatives, natural gums like guar gum, alginate, locust bean gum etc. are used as functional hydrocolloids. Dissolving these high molecular weight natural polymers takes a significant amount of time and usually requires heating. Hydrogels based on these natural polymers are biodegradable, which can lead to stability issues. Furthermore, typical cross-linking agents for polysaccharides are salts with polyvalent cations such as Ca2+ and Mg2+, which react with carboxyl functional groups in the molecular chain of the polysaccharide. Other cross-linking agents for polysaccharides include borate ions or chelated titanium esters that react with hydroxyl groups in the polysaccharide chain. These cross-linkers are not compatible with latex binders, and result in flocculation of waterborne latexes. Decorative performance is also limited due to limitation of these materials and reactions.

Most of the currently available MCP commercial products are applied by spraying. They cannot be applied by brush or trowel due to the following reasons: a) the colored granules tend to be broken by shearing force; b) the hard, gelatinous or brittle globules give low surface drag and tend to skid on smooth surfaces; and c) inadequate separation between the dispersed phase and the continuous phase aggravates the tendency to skid. While application by spray-gun is widely used, the requirement of such a special application instrument has limited the use of prior art MCPs in many applications, especially in the interior wall and do-it-yourself markets.

In addition, due to limitations of the material systems used in MCP, the water resistance of the paint typically is poor; therefore, multilayer coating is necessary to solve this problem, including the use of a prime coat, middle coat and top coat. This complicated application is time consuming, labor intensive and relatively high cost.

In view of the deficiencies of the prior art, it is desirable to develop an improved system that can be used in the preparation of multicolor paints. In addition, it would be desirable to have a multicolor coating composition comprising a gel that would be compatible with a wide variety of binders to give more options to painters.

SUMMARY OF THE INVENTION

The composition of the invention is such a composition useful for the preparation of multicolor coatings, the composition comprising: a) a colorant, b) a first hydrophilic polyurethane prepolymer gel, c) a second gel, and d) a continuous phase, wherein zero or more of the following optional components may be included: an extender, a dispersant, a biocide, a defoamer and/or a rheology modifier.

Surprisingly, the composition of the invention has good water resistance, is easy to apply, and is compatible with a variety of binders.

DETAILED DESCRIPTION OF THE INVENTION

Figure 1A:
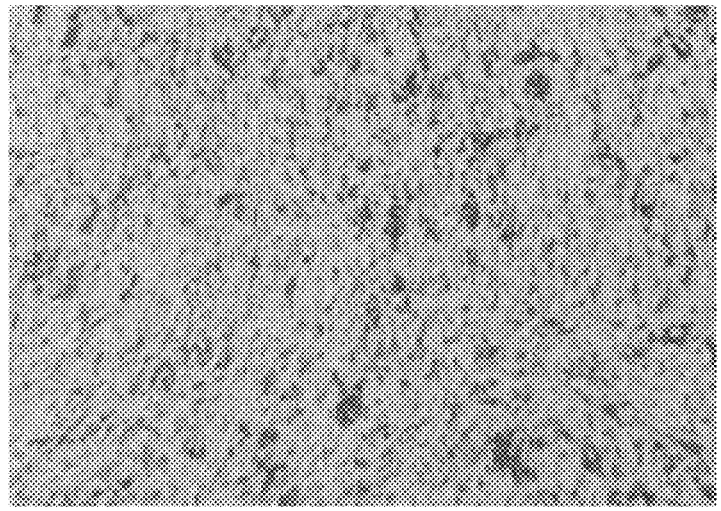
FIGS. 1a through 1d show coatings prepared using the multicolored paints of Examples 1-3 and Comparative Experiment 4, respectively.

The composition of the invention comprises a colorant, a first gel, a second gel and a continuous phase, wherein the first gel comprises a hydrophilic polyurethane prepolymer gel, and the continuous phase comprises zero or more optional components.

As used herein, the terms "a," "an," "the," "at least one," and "one or more" are used interchangeably. The terms "comprises" and "includes" and variations thereof do not have a limiting meaning where these terms appear in the description and claims. Thus, for example, a composition that includes "a" material can be interpreted to mean that the composition includes "one or more" materials.

As used herein, the term "wt. %" refers to weight percent.

As used herein, the term "continuous phase" refers to a phase in which the gels are dispersed. The continuous phase may, however, contain other solids such as, for example, inorganic particulates.

As used herein, the term "prepolymer content of the gel" means the amount of prepolymer in reacted form that is in the first gel.

For the purposes of the invention, the term "silky" in appearance with respect to an MCP means that a dried paint that has been applied to a substrate exhibits a thread-like pattern in which the individual colored areas have a relatively large aspect ratio, i.e. ratio of length to width.

For the purposes of the invention, the term "flaky" in appearance with respect to an MCP means that a dried paint that has been applied to a substrate exhibits a plate-like pattern.

The first gel is a hydrophilic polyurethane prepolymer synthetic gel, which is also referred to herein as a hydrogel. It can be formed by the reaction of water and a hydrophilic modified polyurethane (PU) prepolymer. The reaction proceeds readily at room temperature and atmospheric pressure. In one embodiment of the invention, the first gel is formed by admixing under conditions sufficient to form a gel from 0.5 to 15 wt. % hydrophilic polyurethane prepolymer, from 0.05 to 10 wt. % colorant, from 0 to 20 wt. % of an optional second cross-linker, and water to bring the total to 100 wt. %. Water acts as the first cross-linker, but not all of the water reacts with the prepolymer. In various embodiments, the upper limit on the amount of prepolymer used in forming the first gel is less than 3 wt. %, not more than 5 wt. %, not more than 10 wt. %, or not more than 15 wt. %. In various embodiments, the lower limit on the amount of prepolymer used in forming the gel is at least 0.5 wt. %, at least 1 wt. %, or at least 3 wt. %. Thus, in various embodiments, the prepolymer content of the gel is: from 0.5 wt. % to less than 3 wt. %, not more than 5 wt. %, not more than 10 wt. %, or not more than 15 wt. %; from 1 wt. % to less than 3 wt. %, not more than 5 wt. % not more than 10 wt. %, or not more than 15 wt. %; or from 3 wt. % to not more than 5 wt. %, not more than 10 wt. %, or not more than 15 wt. %. Mixtures of first gels can be employed.

The colored hydrophilic polyurethane prepolymer first gel advantageously is formed by reacting water with a hydrophilic polyurethane prepolymer in the presence of a colorant. In one embodiment of the invention, the prepolymer is a NCO-terminated hydrophilic prepolymer, e.g. a NCO-terminated hydrophilic MDI prepolymer. Advantageously, the prepolymer is contacted with a stoichiometric excess of water to form the first hydrogel. The amount of prepolymer affects the properties of the first gel. Higher amounts of prepolymer tend to lead to a more viscous, or stronger (tougher), first gel, while lower amounts of prepolymer tend to lead to a less viscous, or weaker, first gel, all else being equal. The desired amount of prepolymer to employ can be determined by routine experimentation using the guidance given herein. Similarly, the amount of the optional second cross-linker will affect the properties of the first gel. The texture and strength of the first gel can be adjusted or tuned by cross-linking chemistry. For example, use of a second cross-linker will improve the strength of a first gel, generally speaking. The preparation of certain hydrophilic polyurethane prepolymer gels is described in, e.g., US 2006/01425829.

For the purposes of the invention, the term "weak gel" means a gel that extends to thread-like or plate-like gels after shearing or gel break up. In one embodiment of the invention, a weak gel is a gel that has less than a 3 wt. % prepolymer content of the gel.

For the purposes of the invention, the term "strong gel" means a gel that possesses 3-dimensional (3D) gel granules after the initial gel is broken-up. A "strong gel" is more granular and does not extend to thread-like or plate-like gels after shearing or gel break up. In one embodiment of the invention, a strong gel has at least a 3 wt. % prepolymer content of the gel.

In one embodiment of the invention, the hydrophilic polyurethane prepolymer advantageously is formed by the reaction of an isocyanate and a polyol. In one embodiment of the invention, the prepolymer advantageously is formed by the reaction of an isocyanate and a polyol optionally with an additional amine. In one embodiment of the invention, the prepolymer is an isocyanate-terminated prepolymer and is the reaction product of (a) a polyether polyol composition having a nominal hydroxyl functionality of from 1.6 to 8, a number average molecular weight of from 1,000 to 12,000, and at least 30 wt. % of oxyethylene groups. (b) an isocyanate mixture that contains methylene diphenylisocyanate (MDI) in at least about 60 wt. % of the total isocyanate present and wherein MDI comprises the 2,4'- and 4,4'-methylene diphenylisocyanate isomers in a molar ratio of from 25:75 to 80:20, such that the prepolymer has a free NCO content of from 1 to 5 wt. %. Suitable polyols and isocyanates are commercially available or can be prepared using standard processes known to those skilled in the art. Examples of suitable isocyanates include MDI, toluene diisocyanate (TDI), isophorone diisocyanate (IPDI), and mixtures thereof. In one embodiment of the invention, a polyol and diisocyanate are admixed at from 20 to 100° C., optionally in the presence of a urethane-forming catalyst such as, for example, a tin compound or a tertiary amine, for a time sufficient to form the prepolymer. The ratio of the reactive functional groups of the polyol to the reactive functional groups of the isocyanate is sufficient to obtain the desired free NCO content, e.g. from 1 to 5 wt. %, in the prepolymer, and can be readily calculated by one skilled in the art in order to determine how much polyol and isocyanate to employ in the preparation of the prepolymer.

Conventional additives, such as additives known in the art for use in forming prepolymers and polyurethanes, may be used in the preparation of the prepolymer. For example, the composition for forming the prepolymer may include at least one catalyst, at least one cross-linker, and/or at least one chain extender. Further information on the preparation of the prepolymer may be found in US 2006/0142529 and US 2015/0087737.

The polyol advantageously is a polyoxypropylene-polyoxyethylene polyol having a number average molecular weight of from 3,000 g/mole to 9,000 g/mole and a polyoxyethylene content of at least 50 wt. %, based on a total weight of the polyoxyethylene-polyoxypropylene polyol). The polyoxypropylene-polyoxyethylene polyol may have a nominal hydroxyl functionality from 1.6 to 8 (e.g., 1.6 to 4.0). In one embodiment of the invention, the remainder of the weight content of the polyoxyethylene-polyoxypropylene polyol based on a total of 100 wt. % is accounted for with polyoxypropylene, e.g., the polyoxypropylene content is at least 5 wt. % in the polyol. For example, the polyoxyethylene content advantageously is from 55 wt. % to 85 wt. %, from 60 wt. % to 80 wt. %, from 65 wt. % to 80 wt. %, from 70 wt. % to 80 wt. %, and/or from 74 wt. % to 76 wt. %, with the remainder being polyoxypropylene.

The polyol may include at least one other polyether polyol. The at least one other polyether polyol may have an average nominal hydroxyl functionality from 1.6 to 8 (e.g., 1.6 to 4.0) and a number average molecular weight from 1000 to 12,000 (e.g., 1,000 to 8,000, 1,200 to 6,000, 2,000 to 5,500, etc.). Further, combinations of other polyether polyols, including monohydroxyl substances and low molecular weight diol and triol substances or amines, of varying functionality and polyoxyethylene content may be used in the composition for preparing the prepolymer.

The polyol may also include polyethylene glycol (also known as PEG and polyoxyethylene glycol). The polyethylene glycol may have a number average molecular weight from 500 g/mol to 2000 g/mol (e.g., from 500 g/mol to 1500 g/mol, from 750 g/mol to 1250 g/mol, from 900 g/mol to 1100 g/mol, etc.).

Advantageously, a prepolymer having a positive amount of less than 5 wt. %, or less than 3 wt. %, isocyanate groups is employed to prepare the hydrogel. In various embodiments of the invention, the prepolymer has from 1 to 3 wt. %, from 1 to 5 wt. %, from 1.5 to 5 wt. %, or from 1.5 to 3 wt. %, free isocyanate groups. Mixtures of prepolymers can be employed.

Various hydrophilic PU prepolymers are known in the art. Useful prepolymers are available from The Dow Chemical Company under the HYPOL™ brand including, for example, HYPOL™ JT6005 brand prepolymer and HYPOL™ 2060 GS brand prepolymer. HYPOL™ JT6005 brand prepolymer is a TDI-based polyurethane prepolymer having an NCO content of 3.1% as determined by ASTM D 5155 and a viscosity at 20° C. of 10,000 as determined by ASYM D 4889.

In one embodiment of the invention, the prepolymer can be reacted with an active-hydrogen-containing molecule, such as, for example, an amine, alcohol or water, to form the first gel. In one embodiment of the invention, the prepolymer is reacted with only water, and not an amine or alcohol, in order to form the first gel.

In one embodiment of the invention, a portion of the water is employed to react with the prepolymer to create the first gel, and no other cross-linker is employed in gel formation. The absence of other added cross-linkers for first gel formation is advantageous in that there is no unreacted residual second cross-linker to pose the threat of flocculation to the latex or other binder employed in the composition of the invention.

The colorant may be organic or inorganic, preferably inorganic, and may be in particulate form. Colorants are well known to those skilled in the art, and many are commercially available. Examples of the colorants include, but are not limited to, titanium dioxide white, carbon black, lampblack, black iron oxide, red iron oxide, transparent red oxide, yellow iron oxide, transparent yellow oxide, brown iron oxide, phthalocyanine green, phthalocyanine blue, naphthol red, quinacridone red, quinacridone magenta, quinacridone violet, DNA orange, organic yellow, and any combination thereof. Mixtures of colorants can be employed. The amount of colorant employed is an amount that is sufficient to impart the desired color to the MCP. In various embodiments of the invention, the gel comprises from 0.05 to 10 wt. % colorant, or from 0.1 to 1 wt. % colorant, based on the weight of the gel. At least one gel employed comprises a colorant. In one embodiment of the invention, both gels are colored, while in another embodiment, only one gel is colored. The composition of the invention may include multiple colored gels such as, for example, more than one first gel wherein each first gel comprises a different colorant than another first gel, and/or more than one second gel wherein each second gel comprises a different colorant than another second gel.

An extender optionally may be employed. For example, the colorant optionally may be mixed with an extender, and/or an extender may be employed in the continuous phase. As used herein, the term "extender" refers to a particulate inorganic material having a refractive index of less than or equal to 1.8 and greater than 1.3 and includes, for example, calcium carbonate, calcium sulfate, aluminosilicates, silicates, zeolites, mica, diatomaceous earth, solid or hollow glass, and ceramic beads. Mixtures of extenders can be employed.

In one embodiment of the invention, an optional, second cross-linker is employed in the formation of the first gel when additional gel strength or toughness is desired. Cross-linkers are well known in the art. Examples of suitable cross-linkers include hydrophilic polyisocyanates, silanes, and polyamines. Mixtures of cross-linkers can be employed.

The strength or toughness of the first hydrogel can be easily adjusted or tuned by the concentration of the prepolymer, the optional second cross-linker, the colorant, especially when the colorant is inorganic, and optional extenders. When the first gel is weak, the colorant in the gel may not be well protected and clay from the continuous phase may help to protect the colorant. Without wishing to be bound by any theory, it is possible that the clay may collect or assemble on the surface of the dispersed first gel to inhibit the release of colorant from the first gel. With a high concentration of the reacted prepolymer in the first gel, e.g. more than 3 wt. %, the colorant can be well protected by the gel structure and it can give a granular pattern to an MCP; however, with low concentration of the reacted prepolymer in the first gel, e.g. less than or equal to 3 wt. %), the colorant may not be well protected by the first gel structure, and the clay can help to protect the colorant and it can give special silky or flaky patterns to an MCP prepared using the first gel.

The second gel is a gel that is different than the first gel, and is not a hydrophilic polyurethane prepolymer gel. The second gel may comprise materials such as a flocculated polyacrylate polymer, a polysaccharide, such as natural gum, e.g. guar gum, locust bean gum, alginate, cellulose, and/or a cellulose derivative. Examples of cellulose derivatives include methylcellulose, hydropropylmethylcellulose, hydroxyethylmethylcellulose, hydroxybutylmethylcellulose, hydroxyethylethylcellulose, and the mixture thereof. The second gel is employed to provide flexibility in the tailoring of the structure, coverage and appearance of a coating prepared from the composition of the invention. Mixtures of second gels may be employed. In one embodiment of the invention the second gel is a natural gel.

The composition of the invention may be used to prepare coatings, such as MCP. A wide variety of coating formulations may be employed. In coating applications, the (colored) gels are dispersed in the continuous phase, which comprises a binder and optional additives. Additives that may be useful in coating or paint formulations include: a coalescing agent; a cosolvent; a surfactant; a buffer; a neutralizer; a rheology modifier, including a thickener; a dispersant; a humectant; a wetting agent; a biocide, including a mildewcide; a plasticizer; a pigment; an extender; a clay; a peptizing agent; a defoamer; an anti-skinning agent; a flowing agent and/or an antioxidant. However, as demonstrated in the examples that follow, MCPs may be prepared using relatively simple formulations.

The continuous phase comprises at least one binder and can include various optional components. In one embodiment of the invention, the continuous phase comprises from 1 to 70 wt. % binder, from 0 to 3 wt. % defoamer, from 0 to 40 wt. % or 50 wt. % pigment, from 0.05 to 10 wt. % colorant, from 0 to 50 wt. % extender, from 0 to 3 wt. % dispersant, from 0 to 3 wt. % biocide, and from 0 to 3 wt. % rheology modifier, wherein the total weight of the continuous phase is 100 wt. %. In one embodiment of the invention, the continuous phase comprises from 1 to 70 wt. % binder, from zero to 10 wt. % clay, from 0 to 3 wt. % defoamer and from 0 to 3 wt. % rheology modifier, wherein the total weight of the continuous phase is 100 wt. %. In one embodiment of the invention, the continuous phase comprises from 1 to 70 wt. % binder, from 0 to 3 wt. % defoamer, from 0 to 40 wt. % pigment, from 0 to 50 wt. % extender, from 0 to 3 wt. % dispersant, and from 0 to 3 wt. % biocide, from zero to 10 wt. % clay, and from 0 to 3 wt. % rheology modifier, wherein the total weight of the continuous phase is 100 wt. %. Additional water and/or other optional additives may be employed as needed to bring the binder phase to 100 wt. %.

The binder serves to promote film formation and to bind the components of the composition together, especially in a coating prepared from the composition of the invention. Binders are well-known in the art. Examples of binders include aqueous resin systems such as synthetic latexes and mechanical dispersions, including acrylic-based latexes, styrene acrylic latexes, styrene/butadiene latexes, polyurethane dispersions, polyolefin dispersions, polyurethane-acrylic hybrid dispersions, and epoxy dispersions. A binder may be flexibly incorporated either in the first gel, second gel, or both gels, and/or in the continuous phase of a final paint formulation. More than one binder may be employed.

The pigment comprises an inorganic material that is capable of materially contributing to the opacity, or hiding capability, of a composition, and especially of a coating prepared from such a composition. Suitable pigments advantageously have a refractive index of greater than 1.8. Examples of pigments include titanium dioxide ($TiO_2$), zinc oxide, zinc sulfide, barium sulfate, barium carbonate, and lithopone. $TiO_2$ is preferred. In various embodiments of the invention, the amount of pigment is from 0 to 50 wt. %, from 0 to 40 wt. % or from 5 to 25 wt. % of the weight of the continuous phase. More than one pigment may be employed.

A defoamer may be employed to adjust the foaming properties of the composition to make it suitable for the desired end use. For example, a defoamer may be employed to reduce the foaming tendencies of a composition enough to make it more suitable for use as a coating or paint. Defoamers are well known to those skilled in the art, and many are commercially available. Examples of defoamers include, but are not limited to, silicone-based and mineral oil-based defoamers. Mixtures of defoamers may be employed.

A rheology modifier may be employed to adjust the rheology of the composition to make it suitable for the desired end use. For example, a rheology modifier may be employed to thicken the composition enough to make it more suitable for use as a coating or paint. Rheology modifiers are well known to those skilled in the art, and many are commercially available. Examples of rheology modifiers include polyvinyl alcohol, hydrophobically modified alkali soluble emulsions, alkali-soluble or alkali-swellable emulsions, hydrophobically modified ethylene oxide-urethane polymers, cellulosic thickeners, and the like. Mixtures of rheology modifiers may be employed.

Dispersants may include nonionic, anionic and cationic dispersants such as polyacid with suitable molecular weight, 2-amino-2-methyl-1-propanol, dimethyl aminoethanol, potassium tripolyphosphate, trisodium polyphosphate, citric acid and other carboxylic acids. Preferred dispersants are the polyacids with suitable molecular weight range. The polyacids include homopolymers and copolymers based on polycarboxylic acids, including those that have been hydrophobically or hydrophilically modified, e.g., polyacrylic acid or polymethacrylic acid or maleic anhydride with various monomers such as styrene, acrylate or methacrylate esters, diisobutylene, and other hydrophobic or hydrophilic comonomers as well as the salts of the aforementioned dispersants, and mixtures thereof. The molecular weight of such polyacid is from 400 to 50,000, preferably from 400 to 30,000, more preferably from 500 to 10,000, even more preferably from 1,000 to 5,000, and most preferably from 1,500 to 3,000. More than one dispersant may be employed.

A clay optionally may be employed in the composition of the invention. A wide variety of clays suitable for use in coatings are well-known in the art, and many are commercially available. Examples of clays include aluminum magnesium silicates, and hydrous aluminum phyllosilicates, sometimes with variable amounts of cations of iron, lithium, magnesium, alkali metals, alkaline earths, and other cations. Mixtures of clays may be employed.

A peptizing agent may be employed, e.g. in an amount of from 0.01 to 1 wt. % of the weight of the continuous phase, when a clay is employed, and serves to keep the clay from forming a gel in the continuous phase. Examples of peptizing agents include sodium carbonate, sodium polyphosphate, sodium metaphosphate, sodium polyacrylate, sodium hydroxide, and pyrophosphates, such as potassium pyrophosphate and sodium pyrophosphate. Peptizing agents are well known to those skilled in the art, and many are commercially available. Mixtures of peptizing agents may be employed.

In one embodiment of the invention, the weight ratio of the total gel, i.e. the combined weight of the first gel and the second gel, to the continuous phase is from 1:20 to 10:1. Advantageously, the weight ratio of first gel to second gel is from 5:95 to 95:5. In one embodiment, the composition of the invention comprises from 0.1 wt. % to 15 wt. %, preferably from 0.3 wt. % to 10 wt. %, and more preferably from 0.5 wt. % to 5 wt. %, of a first gel; and from 0.1 wt. % to 15 wt. %, preferably from 0.3 wt. % to 10 wt. %, and more preferably from 0.5 wt. % to 5 wt. %, of a second gel.

The composition of the invention may be prepared, e.g., by a process comprising the following steps:
1) forming a first, optionally colored, gel;
2) forming a second, optionally colored, gel;
3) breaking up each gel, or a mixture thereof, by mechanical means to form broken up gel particles of a desired particle size;
4) preparing a continuous phase comprising a binder and optionally other components; and
5) admixing the particles with the continuous phase.

In one embodiment of the invention, the composition of the invention may be prepared, e.g., by a process comprising the following steps:
1) dispersing a colorant in water;
2) adding a hydrophilic polyurethane prepolymer into the colorant dispersion with stirring, and allowing a first colored gel to form;
3) breaking up the first gel by mechanical means;
4) adjusting the particle size of the first gel to obtain first gel granules of the desired average particle size;
5) mixing the granules with a continuous phase formulation or the components of such a formulation to form a first colored gel/binder dispersion;
6) dispersing a second colorant in water to form a second colorant dispersion;
7) adding a second gel into the second colorant dispersion;
8) breaking up the second gel by mechanical means;
9) adjusting the particle size of the second gel to obtain second gel particles of the desired average particle size;
10) mixing the granules with a continuous phase formulation or the components of such a formulation to form a second colored gel/binder dispersion; and
11) admixing the first and second colored gel/binder dispersions.

These steps can all be achieved using techniques well known to those skilled in the art. For example, in step 4 in the preceding paragraph the gel from step 3 may be filtered using a sieve to get the desired gel granule size. The process may be repeated to form first and second gels having different colorants.

The dispersed colored gel in the continuous phase may be made into a coating composition, e.g. an MCP, by formulation with one or more optional conventional coating additives, an exemplary but nonlimiting list of which is included hereinabove. These materials and their usage are well known in the art and many are commercially available. The formulation of coatings is discussed, e.g., in US 2015/0059616.

A surfactant may be employed to adjust the properties of the MCP. Examples of surfactants include anionic, nonionic, cationic, and amphiphilic surfactants. Preferably, anionic and nonionic surfactants, and more preferably, nonionic surfactants are employed. Surfactants are well known to those skilled in the art, and many are commercially available. Mixtures of surfactants may be employed.

The MCP may include an optional biocide. The biocide may be organic or inorganic. Examples of biocides are described in U.S. Pat. No. 4,127,687 to DuPont, in U.S. Pat. No. 4,898,895 to Masuoka et al., and in WO1995/032862A1. Preferably, the biocide comprises at least one of chloromethylisothiazolinone, methylisothiazolinone, one with the active structure of diiodomethyl-p-tolylsulfone, or 4,5-dichloro-2-octyl-2H-isothiazol-3-one (DCOIT). Biocides are well known to those skilled in the art, and many are commercially available. Mixtures of biocides may be employed.

The composition of the invention is useful for the preparation of coatings, such as interior wall decorative coatings. Advantageously, multicolor paints made using the composition of the invention may be applied by spray or nonspray methods, including application by trowel and/or brush on a substrate. Prior art cellulose- and clay-based MCPs have poor shear resistance and can only be applied by spray gun. In addition, paints of the invention advantageously may be easily prepared using a simple process. Suitable substrates include concrete, cement board, medium-density fiber board (MDF) and particle board, gypsum board, wood, stone, metal, plastics, wallpaper and textile. Preferably, all the substrates are pre-primed by waterborne or solvent-borne primers.

Because the gel system, which comprises the first and second gel, has good compatibility with binders, such as latex binders, coatings prepared from the composition of the invention may contain a relatively high proportion of binder, which may include relatively hydrophobic binders, and therefore have a high potential to achieve good water resistance, even without a protective top coat.

In one embodiment of the invention, the first gel is the reaction product of a hydrophilic polyurethane prepolymer and water, and the first gel comprises water, from 0.5 to 15 wt. % prepolymer in reacted form, from 0.05 to 10 wt. % colorant, and from 0 to 20 wt. % second cross-linker in reacted form, wherein the total weight of the gel is 100 wt. %.

Specific Embodiments of the Invention

All parts and percentages in the following experiments are by weight unless otherwise indicated.

TABLE 1

Raw Materials

| Function | Ingredients | Supplier |
|---|---|---|
| PU prepolymer | HYPOL ™ JT6005 | The Dow Chemical Company |
|  | HYPOL ™ JT2060 | The Dow Chemical Company |
| Polysaccharide | JAGUAR™ HP 8FF guar 2-hydroxypropyl ether | Solvay S.A. company |
|  | METHOCEL ™ K 100M hydroxypropylmethylcellulose | The Dow Chemical Company |
| Colorant | XERACOLOUR ™ red oxide colorant | ICC International Chemical Corporation |
|  | XERACOLOUR ™ rust red colorant | ICC International Chemical Corporation |
|  | XERACOLOUR ™ green colorant | ICC International Chemical Corporation |
|  | XERACOLOUR ™ blue colorant | ICC International Chemical Corporation |
| Binder | PRIMAL ™ TX-010 acrylic emulsion | The Dow Chemical Company |
|  | PRIMAL ™ AC261p acrylic emulsion | The Dow Chemical Company |
|  | PRIMAL ™ TX-011 acrylic emulsion | The Dow Chemical Company |
|  | PRIMAL ™ SF-155 acrylic emulsion | The Dow Chemical Company |
|  | PRIMAL ™ TX310 brand binder | The Dow Chemical Company |
|  | PRIMAL ™ TX220 brand binder | The Dow Chemical Company |
| Rheology modifier | ACRYSOL ™ TT-935 | The Dow Chemical Company |
| Defoamer | NOPCO ® NXZ | Henkel |
| Clay | Laponite ® RD | BYK |
| Pigment | TI-PURE ™ R706 $TiO_2$ | E. I. du Pont de Nemours and Company |
| Cross-linker | Tyzor ® 217 | Dorf Ketal Chemicals |

The formulations employed in the following preparations, examples and comparative experiments are given in Table 2.

TABLE 2

Formulation Components

| Examples | HYPOL gel | | Natural gel | | |
|---|---|---|---|---|---|
|  | HYPOL dispersion | Latex dispersion | Natural gel dispersion | Latex dispersion | Continuous phase |
| Example 1 | HYPOL2060TM 0.60 g | AC261P 4.55 g | 8FF 0.24 g | / | / |
|  | Colorant Red 0.20 g | Clay 2.25 g | K100 0.12 g |  |  |
|  | Water 9.60 g | Water 43.20 g | TiO2 2.0 g |  |  |
|  |  |  | Colorant blue 0.1 g |  |  |
|  |  |  | TX-010 12.9 g |  |  |
|  |  |  | Water 14.63 g |  |  |
|  |  |  | TYZOR 0.1 g |  |  |

TABLE 2-continued

| | Formulation Components | | | | |
|---|---|---|---|---|---|
| | HYPOL gel | | Natural gel | | |
| Examples | HYPOL dispersion | Latex dispersion | Natural gel dispersion | Latex dispersion | Continuous phase |
| Example 2 | HYPOL2060TM 0.26 g<br>Colorant Red 0.10 g<br>Water 19.20 g | AC261P 4.55 g<br>Clay 2.25 g<br>Water 43.20 g | 8FF 0.24 g<br>K100 0.12 g<br>TiO2 2 g<br>Colorant blue 0.1 g<br>TX-010 12.9 g<br>Water 14.63 g<br>TYZOR 0.1 g | / | / |
| Example 3 | HYPOL2060TM 0.30 g<br>Colorant Red 0.10 g<br>Water 19.20 g | AC261P 0.91 g<br>Clay 0.45 g<br>Water 8.64 g | 8FF 0.40 g<br>K100 0.20 g<br>TiO2 2 g<br>Colorant blue 0.1 g<br>TX-100 25.00 g<br>Water 24.39 g<br>TYZOR 0.12 g | AC261P 0.91 g<br>Clay 0.45 g<br>Water 8.64 g | / |
| Example 4 | HYPOL2060TM 0.70 g<br>Colorant Red 0.10 g<br>SF-155 10.0 g<br>Water 9.20 g | / | 8FF 0.24 g<br>K100 0.12 g<br>TiO2 2 g<br>Colorant blue 0. 1 g<br>TX-010 12.9 g<br>Water 14.63 g<br>TYZOR 0.1 g | / | TT-935 0.2 g<br>NZX 0.1 g<br>TX-010 10 g |
| Comparative Experiment A | / | / | Red natural gel: TX-220 20.10 g<br>(Natural cellulose gel inside)<br>Colorant red 0.1 g;<br>Green natural gel:<br>TX-220 20.10 g<br>(Natural cellulose gel inside)<br>Colorant green 0.1 g | TX-310 59.8 g<br>(clay inside) | TX-310 59.8 g<br>(clay inside) |

Preparation 1: Preparation of Gels

A colorant and prepolymer are dispersed in water sequentially with stirring at 50-200 rpm to form a first gel. The desired particle size of the first gel is obtained by shearing at 500 rpm for 2 min. The first gel is dispersed with stirring into a dispersion of clay in latex. The resulting first mixture is saved for later use. This process is repeated for as many different colorants as desired.

The water soluble polymer powders JAGUAR™ HP 8FF brand guar 2-hydroxypropyl ether and METHOCEL™ K 100M brand hydroxypropylmethylcellulose are dispersed into water with stirring at 200-1500 rpm for 5 min in a vessel, and are then incubated at 60-90° C. for 10 min with stirring at 500-2000 rpm. The vessel is then cooled in an ice water bath for 10 min with stirring at 500-2000 rpm to form a second gel. A binder, colorant, and optionally clay, extender, dispersant, biocide, rheology modifier, defoamer and water are added into the second gel with stirring at 2000 rpm for 20 min. After that, an aqueous solution of the cross-linker Tyzor® 217 is added with stirring at about 200-1000 rpm for 5 min. The resulting second mixture is saved for later use. Different pigmented second gels can be prepared by introducing different colorants.

Preparation 2: MCP Preparation

The first and second mixtures are admixed with stirring at 50-2000 rpm for 10 min to produce a multi-color dispersion. This dispersion is then admixed with stirring with a continuous latex phase to make a multicolor paint base. Optionally, the viscosity of the paint base is adjusted by adding a rheology modifier, ACRYSOL™ TT-935, to form an MCP.

Examples and Comparative Experiment: Coating Results

Each paint is applied on a cement board substrate using a spatula. The appearance of paints prepared using each binder/gel combination are shown in FIG. 1.

In prior art MCPs prepared using only natural gel, i.e. where no first gel is employed, the natural gel globules tend to be destroyed due to poor shear resistance. This makes it difficult to apply the prior art MCPs with normal tools, and leads to poor repeatability of decorative appearance; see FIG. 1d, which shows the coating of Comparative Experiment A.

Figure 1B:
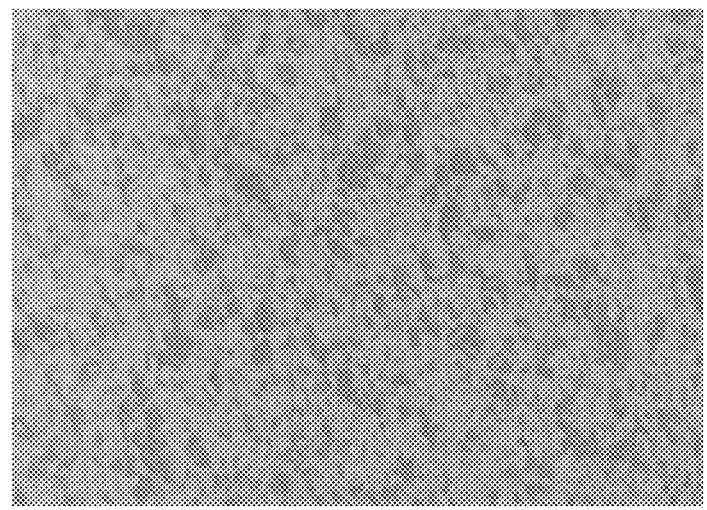
Figure 1C:
Figure 1D:

The paints prepared using the composition of the invention are easily applied by normal tools, e.g. trowel and/or brush, and can be formulated to produce diverse multicolor patterns. The coatings of Examples 1-3 are shown in FIGS. 1a, 1b, and 1c, respectively. Specifically, these coatings show a silk like domain pattern (FIG. 1c), a pattern with irregularly shaped domains (FIG. 1b), and a pattern with hybrid, i.e. a mix of silk like and irregularly shaped, domains (FIG. 1a). The distribution density of colored patterns of the dry paint is easily adjusted by varying the ratio of the first to second gel phase. The substrates are fully covered, and the surfaces are smooth after drying.

The formulation of Example 4 is an MCP that is free of clay and that employs a red first gel and a blue second gel.

The invention claimed is:

1. A composition comprising: a) a colorant, b) a first gel, c) a second gel, and d) a binder, wherein zero or more of the following optional components may be included: an extender, a dispersant, a biocide, a defoamer and/or a rheology modifier, wherein the first gel is cellulose-free and includes a prepolymer dispersion and a latex dispersion that are equal 100 wt. % of a total weight of the first gel, wherein:

the prepolymer dispersion that is the reaction product of a hydrophilic polyurethane prepolymer and water, and the prepolymer dispersion comprises water, from 0.5 to 15 weight (wt. %) prepolymer in reacted form, and from 0.05 to 10 wt. % of the colorant, and wherein the water, the prepolymer in reacted form, and the colorant are equal to 100 wt. % of the prepolymer dispersion; and the latex dispersion including the binder, clay, and water, wherein the binder is a latex binder selected from a group consisting of an acrylic-based latex, a styrene acrylic latex, and a styrene/butadiene latex.

2. The composition of claim 1 wherein the prepolymer content of the first gel is from 0.5 to 10 wt. % prepolymer in reacted form.

3. The composition of claim 1 wherein the weight ratio of first gel to the second gel is from 5:95 to 95:5.

4. The composition of claim 1 wherein the second gel comprises at least one of a guar gum, a cellulose or cellulose derivative, and/or a flocculated polyacrylate polymer.

5. The composition of claim 1 wherein the prepolymer employed to prepare the first gel has a free NCO content of from 1 to 5 wt. %.

6. The composition of claim 1 comprising from 0.05 to 5 wt. % of the first gel, from 0.02 to 3 wt. % of the second gel, and a continuous phase, wherein the weight of the composition totals to 100 wt. %, wherein the gels are dispersed in the continuous phase, and wherein at least one gel comprises from 0.001 to 2 wt. % colorant.

7. The composition of claim 1 further comprising a continuous phase, wherein the continuous phase comprises from 1 to 70 wt. % of a binder, from 0 to 3 wt. % defoamer, from 0 to 3 wt. % rheology modifier, from 0 to 40 wt. % pigment, from 0 to 50 wt. % extender, from 0 to 3 wt. % dispersant, from zero to 10 wt. % clay, and from 0 to 3 wt. % biocide, and wherein the total weight of the continuous phase is 100 wt. %.

8. A multicolor paint prepared using the composition of claim 1 and a continuous phase.

9. The composition of claim 1 wherein the prepolymer content of the first gel is from 0.5 to 5 wt. % prepolymer in reacted form.

10. The composition of claim 1 wherein the prepolymer content of the first gel is from 1 to 5 wt. % prepolymer in reacted form.

11. The composition of claim 1 wherein the prepolymer content of the first gel is from 0.5 to less than 3 wt. % prepolymer in reacted form.

12. The composition of claim 1 wherein the prepolymer content of the first gel is from 3 to 10 wt. % prepolymer in reacted form.

13. The composition of claim 1, wherein the binder, the clay, and the water are equal to 100 wt. % of a total weight of the latex dispersion.

* * * * *